United States Patent [19]

Spinelli et al.

[11] Patent Number: 4,782,361

[45] Date of Patent: Nov. 1, 1988

[54] IMAGING SYSTEM WITH A PLURALITY OF DOCUMENT REGISTRATION POSITIONS

[75] Inventors: Richard A. Spinelli, Rochester; Edward C. Bock, Webster; LeRoy A. Baldwin, Rochester, all of N.Y.

[73] Assignee: Xerox Corporation, Stamford, Conn.

[21] Appl. No.: 24,488

[22] Filed: Mar. 11, 1987

[51] Int. Cl.$^4$ ........................ G03G 15/00; G03B 27/34

[52] U.S. Cl. ........................ 355/14 R; 355/14 SH; 355/56

[58] Field of Search ........................ 355/8, 55, 14 R, 56, 355/14 SH

[56] References Cited

U.S. PATENT DOCUMENTS

| | | | |
|---|---|---|---|
| 3,614,222 | 10/1971 | Post et al. | 355/8 |
| 4,209,248 | 6/1980 | Gibson et al. | 355/8 |
| 4,265,990 | 5/1981 | Stolka et al. | 430/59 |
| 4,498,759 | 2/1985 | Ogawa et al. | 355/8 |
| 4,501,490 | 2/1985 | Miyamoto et al. | 355/55 |
| 4,514,080 | 4/1985 | Matsuzawa et al. | 355/55 X |
| 4,530,592 | 7/1985 | Green et al. | 355/11 |
| 4,639,121 | 1/1987 | Looney | 355/14 R |
| 4,696,564 | 9/1987 | Watanabe | 355/14 R |

*Primary Examiner*—A. T. Grimley
*Assistant Examiner*—Ed Pipala

[57] ABSTRACT

A document registration system is disclosed which enables documents of various sizes to be registered at different corner registration positions on a platen and to be projected onto a photoreceptor so that the projected images have one side aligned along a common edge parallel to the edge of the photoreceptor. A lens drive and control circuit is provided for determining lens position, comparing it with a home position and moving the lens to a new position associated with the particular registration and magnification.

5 Claims, 9 Drawing Sheets

IMAGING SYSTEM WITH A PLURALITY OF DOCUMENT REGISTRATION POSITIONS

The present invention relates generally to a document registration system and, more particularly, to an imaging system which maintains image registration, at an image plane, of documents registered at a plurality of positions on a document platen.

Various methods have been used in the prior art to register documents on a platen so that the latent images formed at a photoreceptor are properly registered with copy paper to which the developed image is transferred. One such method, disclosed in U.S. Pat. No. 4,209,248 includes the steps of positioning the projection lens, upon selection of a magnification value, to the precise position necessary to maintain a reference edge or corner edge of the image in a constant relationship at the photoreceptor. U.S. Pat. No. 4,530,592 discloses a system in which the projection lens undergoes a 3-dimensional movement to maintain corner registration of the document at the image plane. These prior art corner-registered systems are characterized by aligning the edges of documents copied along leading edges of a latent image. The latent image edge ideally coincides with a corresponding leading edge of a copy sheet to which the developed image is transferred.

One problem with prior art systems is that images formed at the photoreceptor are asymmetrical to the photoreceptor center line. This is due to the offsets produced by reproducing different size documents. The asymmetry creates a burden for the downstream process stations which develop the latent image, align copy sheets at a transfer station and fuse the transferred image to the copy sheet.

Another problem with prior art systems is that to accommodate documents which may range from A3 size (11″×17″) to A4 (letter size) or smaller, either a prohibitively expensive wide angle lens must be used, or a smaller angle lens must undergo extensive lens travel to maintain the required registration. To accommodate the lens travel, the lens mounting, typically in the floor of a light housing, requires a fairly wide aperture which tends to degrade the housing light reflection efficiency.

A further problem is encountered with systems incorporating automatic, or semi-automatic document feeding devices which transport an original document onto the platen surface. Often, these systems require a registration position that is different from a registration position used in a manual mode. Hence, adjustments must be made, either to a movable registration guide or to other system parameters such as copy paper position. U.S. Pat. No. 4,639,121 (Looney) discloses a registration system for maintaining a center-registered image at an image plane for two registration positions on a platen, the registration positions displaced in the same direction. There is no teaching on maintaining registration for documents fed or placed on the platen in long and short edge feed positions and for documents of different sizes.

It is therefore desirable to provide a flash illumination system which registers documents of varying size over a continually variable magnification range without excessive lens travel and without a copy paper alignment procedure. The system should also accommodate documents placed on a platen either manually or moved into an exposure position by a document handling device. According to one aspect of the invention, a plurality of document registration positions are identified on a platen, each registration position associated with a specific document size and with a manual or automatic mode of document positioning. According to another aspect of the invention, documents registered along any of the plurality of registration positions are exposed and images projected onto a photoreceptor so that the images are aligned along a common image edge parallel to the edge of the photoreceptor. Electronic inputs, representative of each unique registration position, are sent to system control circuitry which, in turn, generate output signals to a lens drive circuit to move the lens to the position required to maintain the required registration edge at the photoreceptor. A unique algorithm is provided for accomplishing the required lens motion. According to a still further aspect of the invention, the lens is translated towards and away from the photoreceptor during reduction or enlargement modes of operation, respectively, to maintain the desired registration through magnification changes.

More specifically, the invention is directed towards an imaging system for a document reproduction machine, said imaging system including:

a transparent platen for supporting a document to be reproduced, said platen having associated therewith a plurality of document registration positions;

means for generating an electrical signal indicative of each of said plurality of registration positions;

means for generating an electrical signal indicative of a desired magnification value;

an optical system for illuminating said document and for forming latent images of said document on a photosensitive surface, said optical system including a movable projection lens; and control means adapted to receive said electrical signals corresponding to registration position and magnification values, and to move said lens in response to said signals along a registration path to a position whereby each document image is projected onto the photoreceptor so that a common edge lies along a common line at the photoreceptor.

For an understanding of the features of the present invention, reference is made to the drawings.

It will become apparent from the following discussion that the imaging system of the invention system is equally well suited for use in a wide variety of electrophotographic reproduction machines and is not necessarily limited in its application to the particular embodiments shown herein.

Inasmuch as the art of electrophotographic reproduction is well known, the various processing stations employed in the reproduction shown in FIG. 1 will be shown hereinafter schematically and their operation described briefly with reference thereto.

Figure 1:
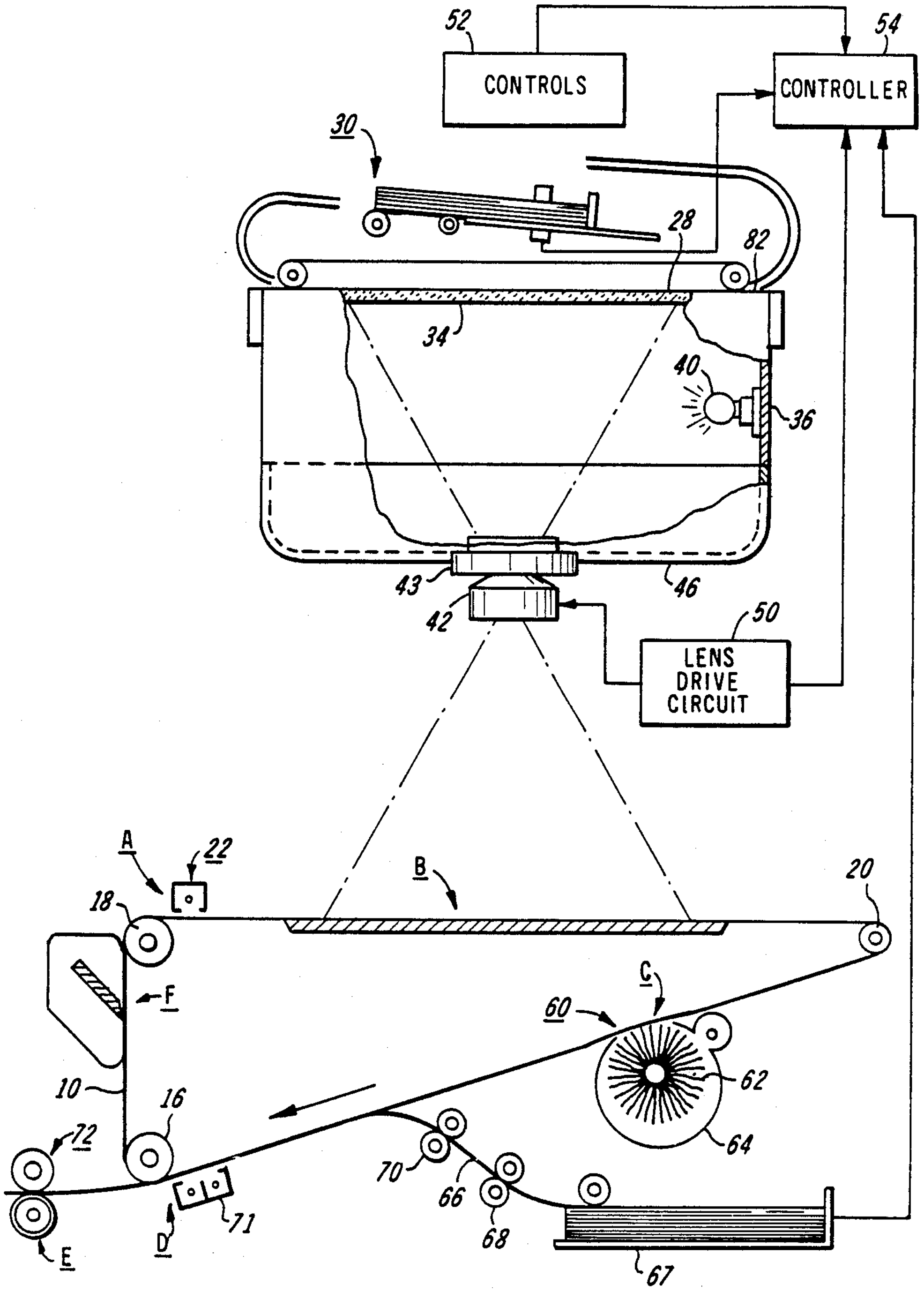
FIG. 1 is a schematic side view of a flash illumination document copier incorporating the registration system components of the present invention.

Turning now to FIG. 1, a document reproduction machine uses a photoreceptor belt 10 having a photoconductive surface formed on a conductive substrate. Preferably, belt 10 has characteristics disclosed in U.S. Pat. No. 4,265,990 whose contents are hereby incorporated by reference. Belt 10 moves in the indicated process direction, advancing sequentially through the various xerographic process stations. The belt is entrained about drive roller 18 and tension rollers 16, 20. Roller 18 is driven by conventional motor means, not shown.

With reference to FIG. 1, a portion of belt 10 passes through charging station A where a corona generating device, indicated generally by the reference numeral 22, charges the photoconductive surface to a relatively high, substantially uniform, potential.

As belt 10 continues to advance, the charged portion of photoconductive surface 12 moves into exposure station B. An original document 28 is positioned, either manually, or by a document feeder mechanism, indicated generally by the reference numeral 30, on the surface of a transparent platen 34.

Platen 34, in a preferred embodiment, is a 17"×17" glass substrate, vertically movable to adjust for conjugate changes during magnification. Feeder mechanism 30 places documents in an exposure position on the platen but it is understood that the document could be positioned either manually or by a semi-automatic document handler (SADH) or by a computer form feeder, as will be discussed below. The illumination system comprises a light housing 36, the top surface of which is defined by platen 34. Within housing 36 is a flash lamp 40 connected to a suitable source of power (not shown).

Lens 42, mounted on carriage 43 is seated in an aperture formed in housing floor 46. All the interior surfaces of the housing are coated with a high reflectivity material, thereby making these surfaces diffusely reflective to light impinging thereon. When lamp 40 is pulsed and caused to flash, light is directed against these coated surfaces, undergoing one or more reflections and irradiating the underside of the platen with a generally uniform level of illumination. The housing thus efficiently functions as a light-integrating cavity which provides a generally uniform illumination level along the bottom of the object plane.

Lens 42 is movably mounted on carriage 43 so as to move horizontally and/or towards or away from the photoreceptor to the particular registration position required to maintain a constant registration edge parallel to the edge of the photoreceptor as a function of magnification. Appropriate mechanisms for moving platen 34 and floor 46 to maintain total conjugate and focus in response to magnification changes is disclosed in U.S. Pat. No. 4,530,592, whose contents are hereby incorporated by reference. The lens horizontal movement is accomplished by lens drive control circuit 50 under control of the system controller 54. This aspect of the invention is described in greater detail below.

Continuing with the system description, development station C, a magnetic brush development system, indicated generally by the reference numeral 60, advances an insulating development material into contact with the electrostatic latent image. Preferably, magnetic brush development system 60 includes a developer roller 62 within a housing 64. Roller 62 transports a brush of developer material comprising magnetic carrier granules and toner particles into contact with belt 10. Roller 62 is positioned so that the brush of developer material deforms belt 10 in an arc with the belt conforming, at least partially, to the configuration of the developer material. The thickness of the layer of developer material adhering to developer roller 62 is adjustable. The electrostatic latent image attracts the toner particles from the carrier granules forming a toner powder image on the surface of the belt.

An output copy sheet 66 is then taken from a supply tray 67. The tray, and therefore each sheet is aligned with the constant registration edge of the projected document image. Paper arrival time at Station D is adjusted by the control circuitry to align with the developed image. The sheets are conveyed from the tray to transfer station D by feed rollers 68, 70. Transfer station D includes a corona generating device 71 which sprays ions onto the backside of sheet 66, thereby attracting the toner powder image from belt 10 to sheet 66. After transfer, the sheet advances to fusing station E where a fusing roller assembly 72 affixes the transferred powder image. After fusing, the copy sheet 66 advances to an output tray (not shown) for subsequent removal by the operator.

After the sheet of support material is separated from belt 10, the residual toner prticles and the toner particles of developed test patch areas are removed at cleaning station F.

Subsequent to cleaning, a discharge lamp, not shown, floods the surface of belt 10 with light to dissipate any residual charge remaining thereon prior to the charging thereof for the next imaging cycle.

In a preferred embodiment, the system operates with a seven pitch cycle, e.g. seven A4 images can be formed, developed and transferred during one belt rotation.

Figure 2:
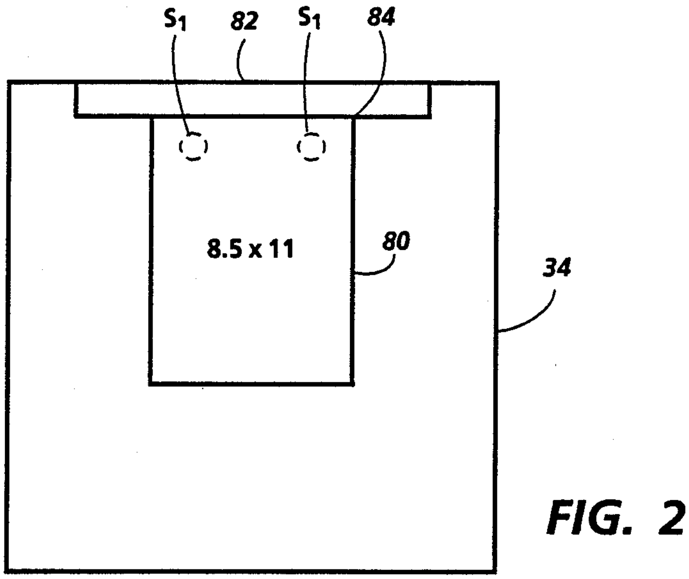
FIG. 2 is a top view of the document platen of FIG. 1 showing a manual registration position for an A4 document.
Figure 3:
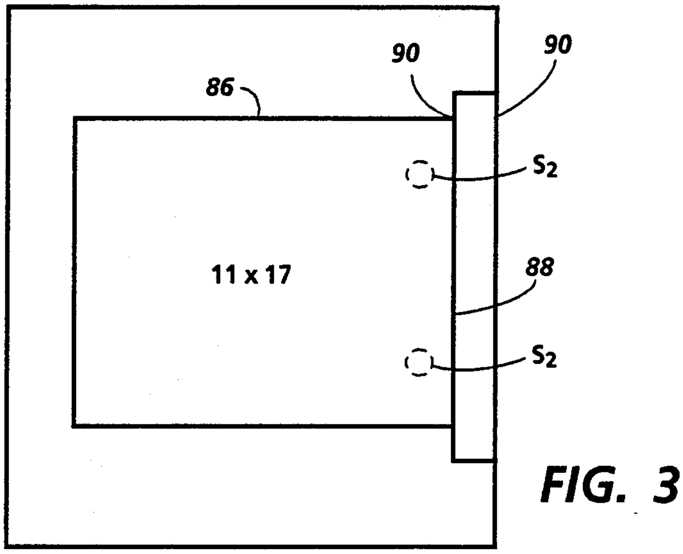
FIG. 3 is a top view of the platen showing the manual registration position of an A3 document.
Figure 4:
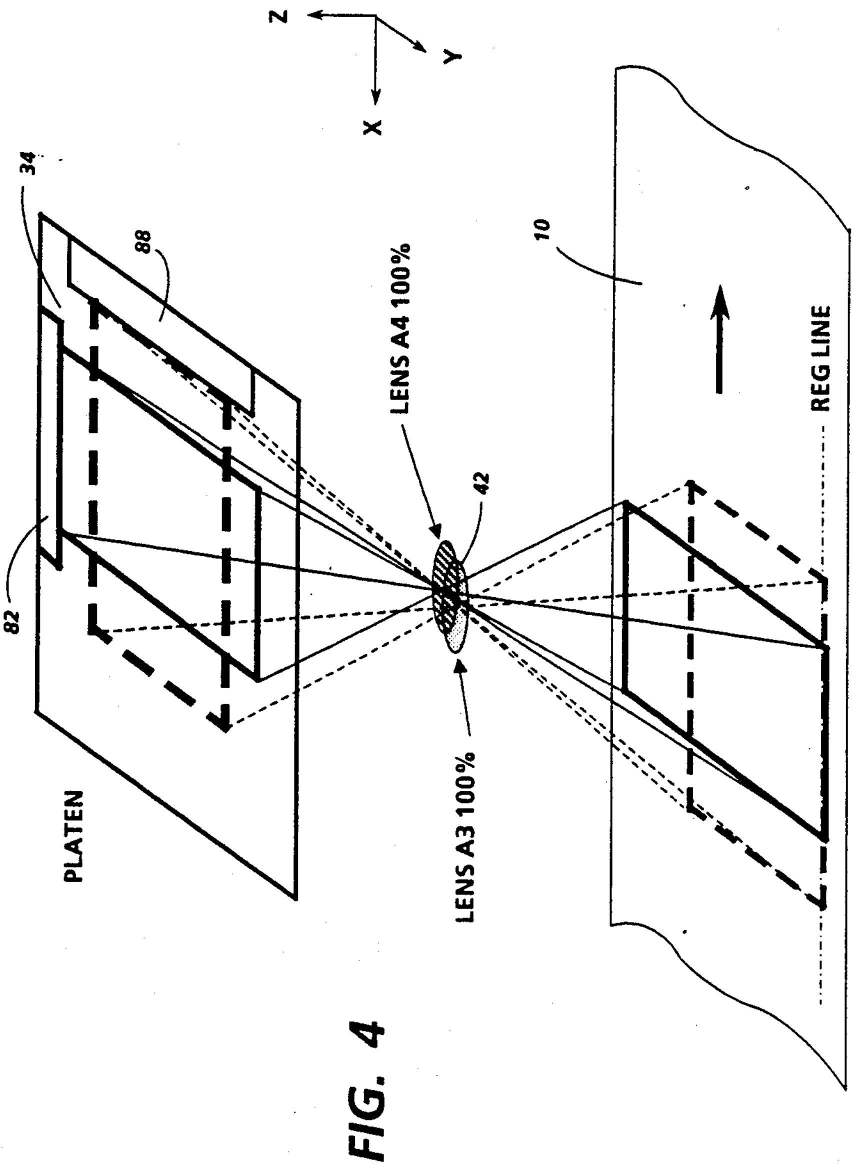
FIG. 4 is a isometric side view of the imaging system of FIG. 1, showing the registration position for the documents in FIGS. 2 and 3.
Figure 5:
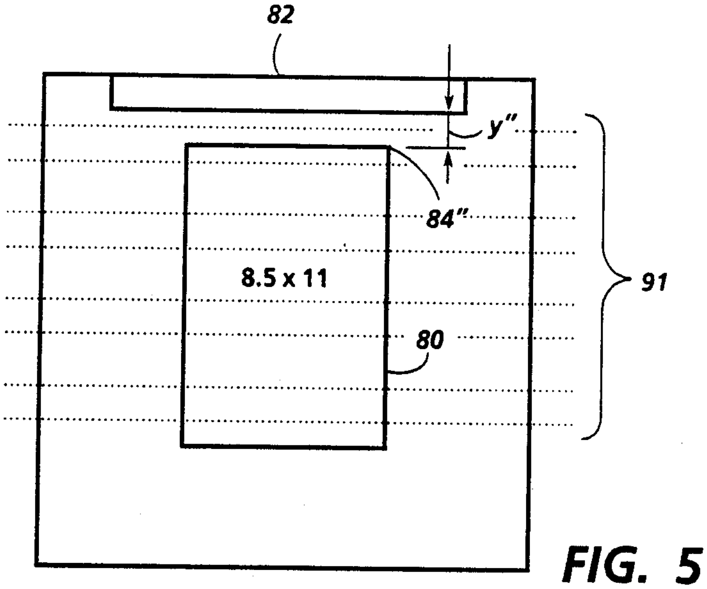
FIG. 5 is a top view of the platen showing the registration position for an A4 document in an RDH mode.

According to one aspect of the invention, a plurality of registration positions at the platen can be accommodated by appropriate movement of lens 42 to maintain a desired constant registration edge position at the photoreceptor. Consider a number of possible document reproduction positions illustrated in the following figures. FIG. 2 shows the top of platen 34 with an A4 ($8\frac{1}{2}\times 11''$) original document 80 registered in a manual mode. The operator places the top edge of document 80 adjacent the fixed, raised manual edge 82 of the platen aligning the document corner with corner registration indicia 84. Sensors S1, S2, located beneath the platen, sense the presence of the document and sends a unique signal to lens drive circuit 50 via associated control circuitry to move lens 42 to the registration-projection position appropriate for the manual A4 mode. FIG. 3 shows an A3 (11×17") original document 86 registered in the manual mode. For this case, the particular output system, as is typical with most reproduction systems, requires A3 paper to be aligned along the same edge as A4 paper. In order to minimize the half-angle requirements of the lens, the original is shifted down (in the Y direction) to a more centered position on the glass. Registration is therefore along edge 88 and at corner registration mark 90. Sensors 52 located beneath the platen detect an A3 manual mode of operation and send signals to circuit 50 to accomplish the appropriate lens movement. FIG. 4 shows the two lens positions associated with the FIGS. 2 and 3 document positions. As shown, lens 42 has been translated along X, Y coordinates so as to maintain one edge of the projected A3, A4 image along a common registration line parallel to the photoreceptor. This registration lens is aligned with the edge of the copy paper being fed from copy tray 67 (FIG. 1). FIG. 5 shows an A4 document positioned on the platen by means of the document handling device 30 of FIG. 1. In a typical document handling device such as shown in FIG. 1, the document is conveyed to and from the platen by means of a multi-belt vacuum transport 91. To ensure that the lead edge of the document, or the belt itself, does not contact the raised manual registration edge 82, the RDH registration is shifted a distance "y" away from edge 82. Thus, registration corner 84' is at a new set of coordinates. The RDH mode is identified by appropriate signals sent from either the control panel or, alternatively, from sensors located at the RDH input. These signals are used to drive the lens to the registration-projection position appropriate to the A4 RDH mode. The copying of an A4 document in the SADH mode can be accommodated by the same registration position.

Figure 6:
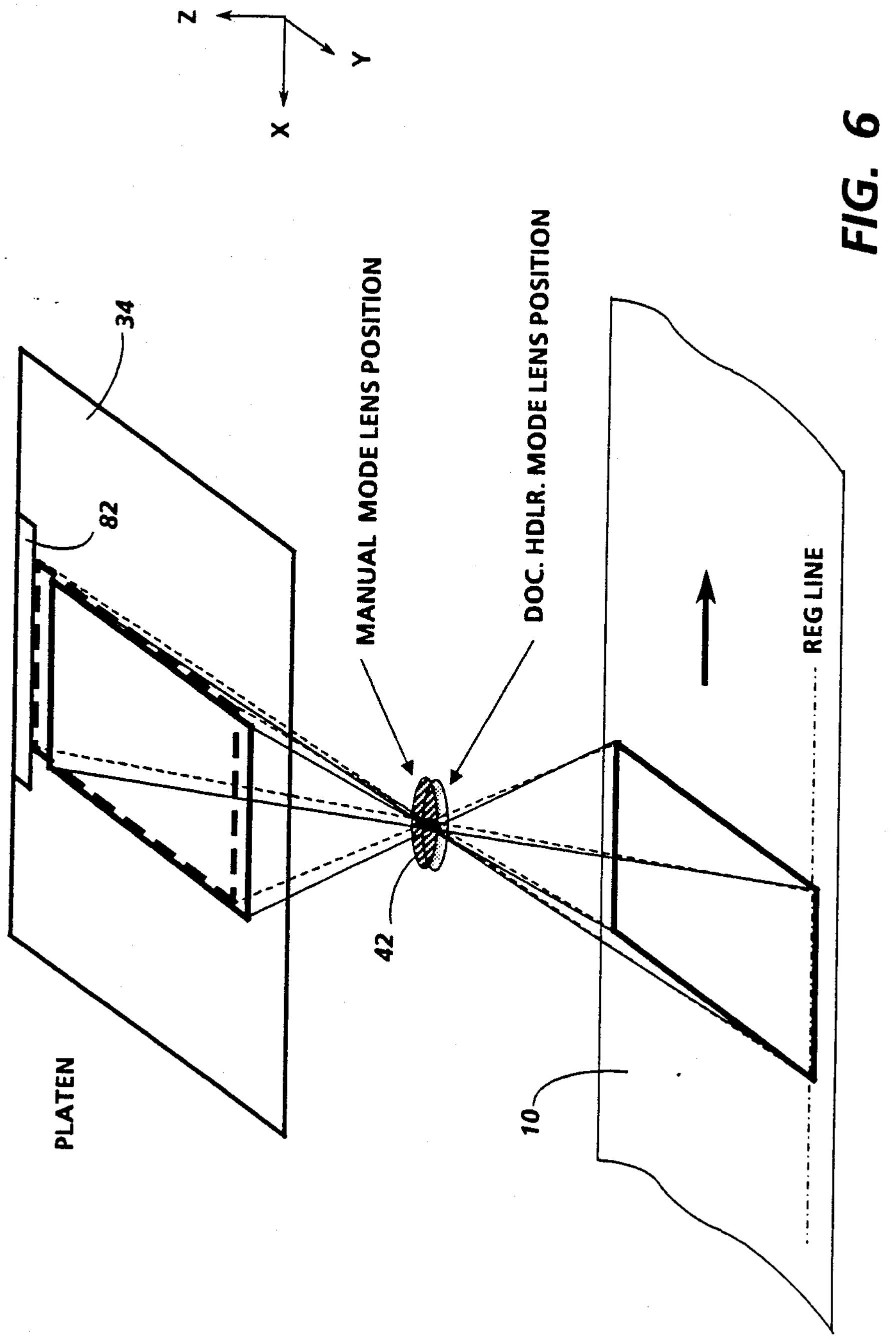
FIG. 6 is a perspective side view of the imaging system of FIG. 1, showing the registration position for the documents in FIG. 5.

FIG. 6 shows the y direction adjustment of lens 42, from the manual A4 copy mode and to the document handling mode. Both corner and edge registration are maintained along a common registration line.

Figure 7:
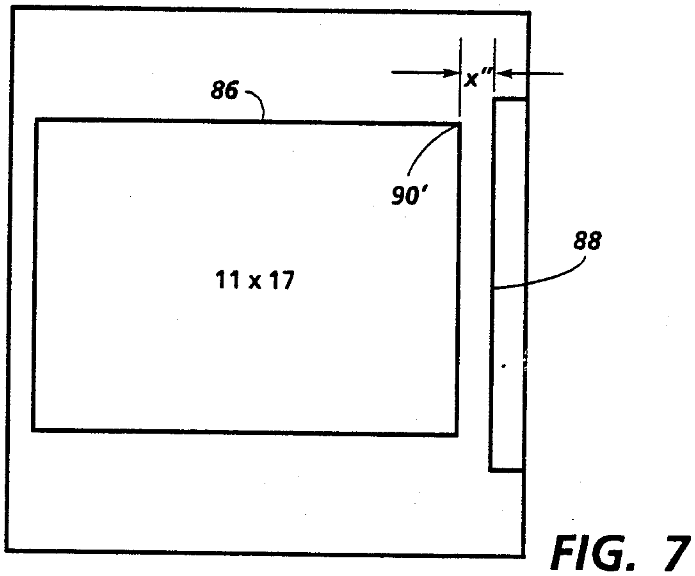
FIG. 7 is a top view of the platen showing the registration position for an A3 document in an RDH mode.

FIG. 7 shows an A3 document 86 positioned on the platen by means of RDH device 30. Here the document 86 is shifted down to a more central position for the same reason discussed above with relation to the manual A3 mode. The registration corner 90', however, is no longer against the manual registration edge but is shifted to the left a distance "x". This new position is needed for this particular embodiment, to accommodate the tapered input of the platen transport which enters the platen glass area at angle. Suitable sensors at the RDH (or SADH) input detect the presence of an A3 document and send appropriate signals to the control circuitry to be translated into signals controlling the lens positioning.

The registration positions shown in FIGS. 2-7 are meant to be illustrative rather than inclusive. Depending on the design for a specific system, SADH positions, for example, may be slightly different than the RDH positions, resulting in additional registration positions. The registration position for a continuous form feeder, in turn, may require a registration position different from either the SADH or the RDH mode. The principles of the invention are intended to include maintaining the required lens registrations for any number of registration positions.

Figure 9:
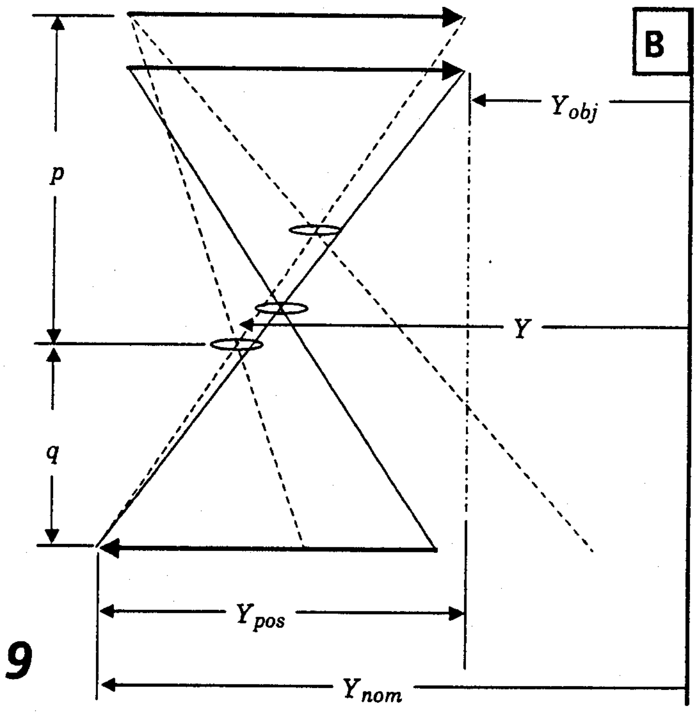
FIG. 9 is a side schematic view of the imaging system of FIG. 1, showing the lens Y coordinate algorithm derivation.

Turning next to the method of enabling the required X-Y coordinate lens motion, an algorithm has been developed and implemented through control circuitry. Referring to FIG. 9, there is shown in side view of the imaging system of FIG. 1 showing the lens at different magnification positions. At the setup of a particular machine, the value MS (magnification selection) is set at 1X. Y pos is an adjustable parameter which is initially adjusted so that the common registration line (e.g. as shown in FIG. 4) is aligned with the edge of the copy paper at the transfer station. Y nom is a constant which is set at a value equal to the nominal datum location of the paper path. Initial registration of the image along the X coordinate is achieved by adjusting the paper arrival time until it aligns with the image. The lens "home" position is established by moving the lens along the X/out axis until sensors outside the normal scan path are activated.

Following initial setup, the "correct" lens position "Y" or "X" for any given magnification (MS=q/p) are given by the expression:

$$Y = Y_{nom} - Y_{pos}\left[\frac{MS}{1 + MS}\right] \quad (1)$$

and $$X = X_{nom} - X_{pos}\left[\frac{MS}{1 + MS}\right] \quad (2)$$

Figure 10:
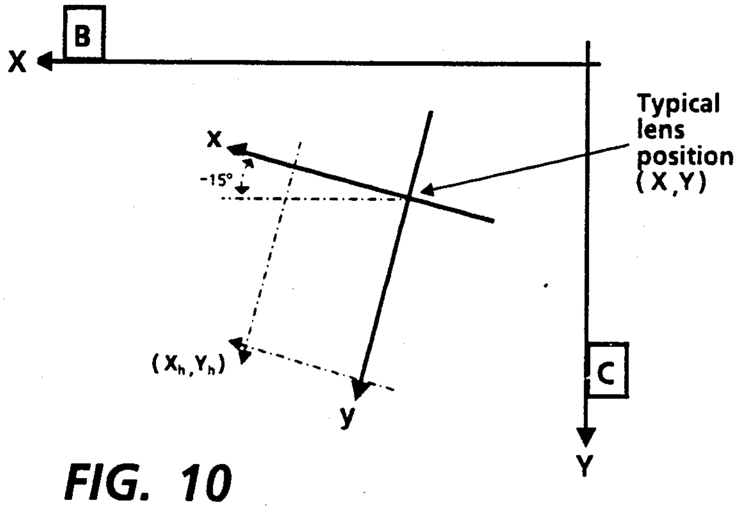
FIG. 10 is a representation of the lens position coordinate system.

In a preferred embodiment of the invention the lens 42 is driven along axes which are both rotated and translated as shown in FIG. 10.

Figure 11:
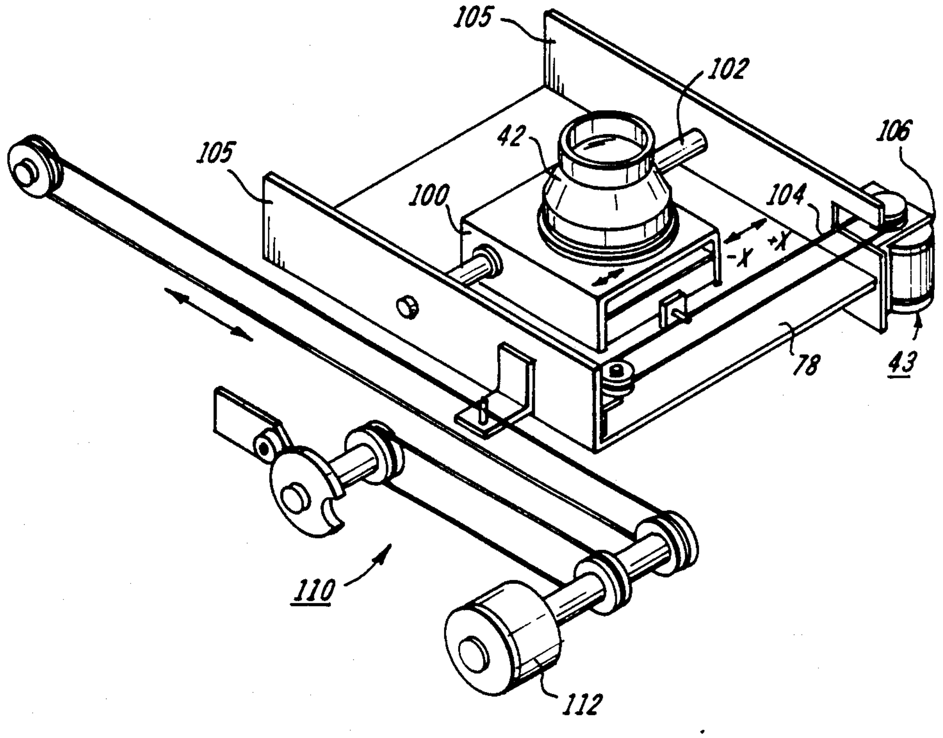
FIG. 11 is an embodiment of the lens drive carriage.

FIG. 11 shows a schematic diagram of the lens carriage 43. As shown, lens 42 is mounted on a first carriage 100 adapted to move in the +X, −X direction along a guide rail 102. The carriage 100 is driven by a pulley/cable arrangement 104 which, in turn is driven by dc stepper motor 106. A second lens carriage 108 is adapted to move in the +Y, −Y direction. Carriage 108 is driven by a pulley/cable arrangement 110 which, in turn, is driven by a stepper motor 112. Inputs to the stepper motors are derived as explained below.

Since the number of steps per unit distance is known, the number of stepper motor steps away from the "home" position required to position the lens for a given magnification and for a given registration number is provided by the following equations (referenced to FIG. 10)

$$S_{absx} = [K_x\cos\theta]X + [K_x\sin\theta]Y + K_x[-X_h\cos\theta - Y_h\sin\theta] = A_0X + A_1Y + A_2 \quad (3)$$

$$A_0 = K_x\cos\theta = -23.06$$

$$A_1 = -K_x\sin\theta = 6.18$$

$$A_2 = -X_h\cos\theta + Y_h\sin\theta = 10111$$

$$S_{absy} = [-K_y\sin\theta]X + [K_y\cos\theta]Y + K_y[-Y_h\cos\theta + X_h\sin\theta] = B_0X + B_1Y + B_2 \quad (4)$$

$$B_0 = -K_y\sin\theta = -3.09$$

$$B_1 = K_y\cos\theta = -11.53$$

$$B_2 = K_y[-Y_h\cos\theta + X_h\sin\theta] = 4932.4$$

Figure 8:
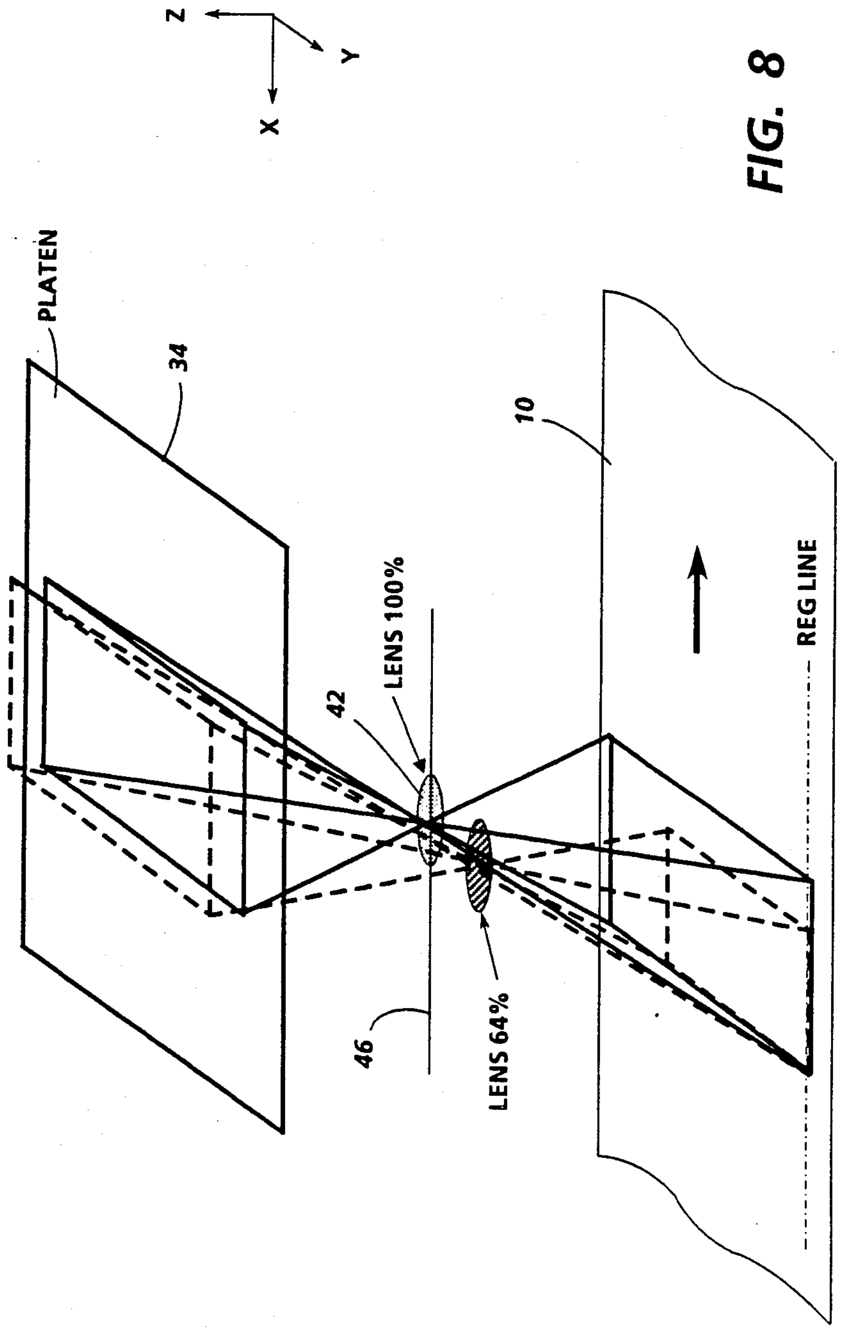
FIG. 8 is a perspective side view of the imaging system of FIG. 1, showing the lens in two magnification positions.

The outputs from controller 96 drive the X and Y stepper motors 106, 112, respectively which, in turn, provide the lens horizontal translational motion. The above descriptions did not take into account magnification changes. Upon a magnification change, the lens undergoes a third Z motion shown in FIG. 8. For illustrative purposes, it is assumed that an A4 document on the platen is to be copied at a 0.64 reduction. Lens 42 is therefore translated toward the photoreceptor by appropriate vertical movement of housing floor 46 and is simultaneously translated along the X-Y coordinate to maintain a corner registered position along the common registration line.

Figure 12:
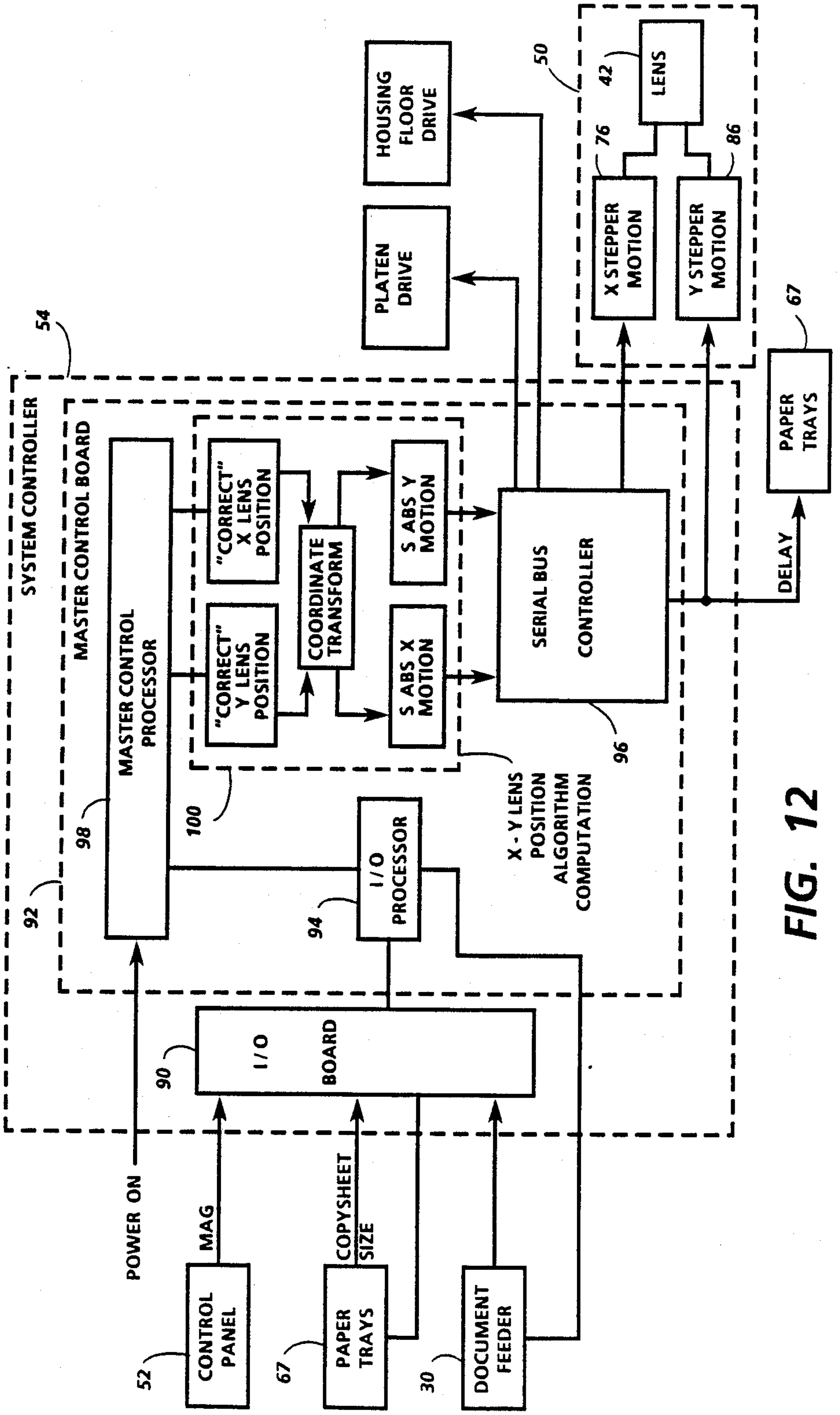
FIG. 12 is a block diagram of the circuitry which controls the lens movement to maintain desired registration of the projected document images at the photoreceptor.

Turning next to the control circuitry, shown in block diagram form in FIG. 12, which enables the required lens motion system, controller 54 consists of an input/output board 90 and a master control board 92 comprising input/output processor 94, a serial bus controller 96 and master control processor 98. Processor 98 can be an Intel Model 8285 programmed to perform the desired functions. Input signals from control panel 52, manual mode document size sensors, document feeder 30 and from paper tray 67 are connected by I/O Board 90; sent to processor 94 and then to master control processor 98. Movement of the lens is controlled by output signals from controller 96 derived from X-Y lens position algorithm computer circuit 100. The "correct" lens position circuits store and compute the information associated with Equations (1) and (2). The "S Abs X and Y Motion" circuits store and compute the information associated with Equations (3) and (4).

The selection of a desired magnificaton is conventionally made at control panel 52. The enabled switches provide a signal to the controller indicative of the selected magnification. A change in magnification results in outputs signals from controller 96 to lens circuit 50 and to the platen and housing floor drives. A change of operation from manual document positioning to an automatic, or semi-automatic document feed mode, is sensed at the document feeder and appropriate signals sent to the I/O Board 90. The signals from copy sheet tray 67 are provided by actuation of a particular copy selection switch by loading a particular copy paper size into the tray.

While the invention has been described with reference to the structure disclosed, it is not confined to the details set forth, but is intended to cover such modifications or changes as may come within the scope of the following claims:

What is claimed is:

1. A imaging system for a document reproduction machine including:

a transparent platen for supporting a document to be reproduced, said platen having at least a first and second document registration edge and an associated first and second corner registration position associated with a first and second mode of operation;

sensing means for generating an electrical signal indicative of the presence of a document aligned with said at least first or second registration edge;

means for generating an electrical signal indicative of a desired magnification value for the document to be reproduced;

an optical system for flash illuminating said document and for forming latent images of said document on a photosensitive surface, said optical system including a projection lens adapted for three dimensional movement; and control means adapted to receive said electrical signals corresponding to a registrated document and said magnification values, and to position said lens, prior to document illumination so as to maintain one edge of a projected image along a common registration line parallel to one edge of photoreceptor through a magnification range and through said operational mode changes.

2. The imaging system of claim 1, wherein said control means incorporates an algorithm for determining the X and Y position coordinates according to the following equations:

$$Y = Y_{nom} - Y_{pos}\left[\frac{MS}{1 + MS}\right] \quad (1)$$

and $$X = X_{nom} - X_{pos}\left[\frac{MS}{1 + MS}\right] \quad (2)$$

where MS is the magnification value.

3. The imaging system of claim 1 wherein said control means to position said lens includes at least one stepper motor associated with the X component of motion and at least one stepper motor associated with the Y component of motion and wherein said stepper motor is operated by signals represented by the following equations:

$$S_{absx} = [K_x\cos\theta]X + [K_x\sin\theta]Y + K_x[-X_h\cos\theta - Y_h\sin\theta] = A_0X + A_1Y + A_2 \quad (3)$$

$$A_0 = K_x\cos\theta = -23.06$$

$$A_1 = -K_x\sin\theta = 6.18$$

$$A_2 = -X_h\cos\theta + Y_h\sin\theta = 10111$$

$$S_{absy} = [-K_y\sin\theta]X + [K_y\cos\theta]Y + K_y[-Y_h\cos\theta + X_h\sin\theta] = B_0X + B_1Y + B_2 \quad (4)$$

$$B_0 = -K_y\sin\theta = -3.09$$

$$B_1 = K_y\cos\theta = -11.53$$

$$B_2 = K_y[-Y_h\cos\theta + X_h\sin\theta] = 4932.4$$

4. The imaging system of claim 1 wherein the document is manually aligned against said one of said registration edges.

5. The imaging system of claim 1 wherein said document is automatically conveyed to the platen by a document handling device and registered along a registration line parallel to one of said registration edges.

* * * * *